US008684818B2

(12) United States Patent
Meyer

(10) Patent No.: US 8,684,818 B2
(45) Date of Patent: Apr. 1, 2014

(54) GAMING SYSTEM, GAMING DEVICE, AND METHOD FOR PROVIDING A REPLAY OF PREVIOUSLY PLAYED GAMES

(75) Inventor: Adam M. Meyer, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 13/396,383

(22) Filed: Feb. 14, 2012

(65) Prior Publication Data

US 2013/0210512 A1 Aug. 15, 2013

(51) Int. Cl.
*A63F 9/24* (2006.01)
*A63F 13/00* (2006.01)

(52) U.S. Cl.
USPC .............................................. 463/20; 463/16

(58) Field of Classification Search
USPC ............... 273/143 R, 292; 463/13, 16, 20, 27
See application file for complete search history.

(56) References Cited

U.S. PATENT DOCUMENTS 4,198,052 A 4/1980 Gauselmann
4,421,310 A 12/1983 Williams
4,624,459 A 11/1986 Kaufman
4,669,731 A 6/1987 Clarke
4,695,053 A 9/1987 Vazquez, Jr. et al.
4,760,527 A 7/1988 Sidley
4,826,169 A 5/1989 Bessho et al.
5,178,390 A 1/1993 Okada
5,205,555 A 4/1993 Hamano
5,342,047 A 8/1994 Heidel et al.
5,393,057 A 2/1995 Marnell, II
5,407,200 A 4/1995 Zalabak
5,423,539 A 6/1995 Nagao
5,449,173 A 9/1995 Thomas et al.
5,456,465 A 10/1995 Durham
5,472,196 A 12/1995 Rusnak
5,560,603 A 10/1996 Seelig et al.
5,647,798 A 7/1997 Falciglia
5,695,402 A 12/1997 Stupak
5,711,525 A 1/1998 Breeding
5,722,891 A 3/1998 Inoue
5,772,506 A 6/1998 Marks et al.
5,775,692 A 7/1998 Watts et al.
5,779,544 A 7/1998 Seelig et al.
5,788,573 A 8/1998 Baerlocher et al.
5,807,172 A 9/1998 Piechowiak
5,823,874 A 10/1998 Adams
5,848,932 A 12/1998 Adams
5,851,010 A 12/1998 Feinberg
5,851,148 A 12/1998 Brune et al.
5,855,514 A 1/1999 Kamille
5,882,261 A 3/1999 Adams
5,911,418 A 6/1999 Adams
5,918,880 A 7/1999 Voigt, IV et al.
5,919,088 A 7/1999 Weiss
5,935,002 A 8/1999 Falciglia
5,947,820 A 9/1999 Morro et al.
5,954,335 A 9/1999 Moody
5,964,463 A 10/1999 Moore, Jr.
5,971,849 A 10/1999 Falciglia
5,980,384 A 11/1999 Barrie (Continued)

*Primary Examiner* — Dmitry Suhol
*Assistant Examiner* — Jason Yen
(74) *Attorney, Agent, or Firm* — Neal, Gerber & Eisenberg LLP

(57) ABSTRACT

Gaming systems, gaming devices, and methods for dynamically maintaining a set of previously generated game outcomes and providing a replay of one or more of the previously generated game outcomes.

32 Claims, 6 Drawing Sheets

(56) References Cited

U.S. PATENT DOCUMENTS

| | | | | |
|---|---|---|---|---|
| 5,984,782 | A | 11/1999 | Inoue | |
| 5,988,638 | A | 11/1999 | Rodesch et al. | |
| 5,997,400 | A | 12/1999 | Seelig et al. | |
| 5,997,401 | A | 12/1999 | Crawford | |
| 6,003,867 | A | 12/1999 | Rodesch et al. | |
| 6,004,207 | A | 12/1999 | Wilson, Jr. et al. | |
| 6,012,982 | A | 1/2000 | Piechowialt et al. | |
| 6,015,344 | A | 1/2000 | Kelly et al. | |
| 6,015,346 | A | 1/2000 | Bennett | |
| 6,045,129 | A | 4/2000 | Cooper | |
| 6,056,642 | A | 5/2000 | Bennett | |
| 6,059,289 | A | 5/2000 | Vancura | |
| 6,059,658 | A | 5/2000 | Mangano et al. | |
| 6,062,980 | A | 5/2000 | Luciano | |
| 6,089,976 | A | 7/2000 | Schneider et al. | |
| 6,089,977 | A | 7/2000 | Bennett | |
| 6,089,978 | A | 7/2000 | Adams | |
| 6,102,400 | A | 8/2000 | Scott et al. | |
| 6,102,798 | A | 8/2000 | Bennett | |
| 6,113,098 | A | 9/2000 | Adams | |
| 6,120,378 | A | 9/2000 | Moody et al. | |
| 6,126,542 | A | 10/2000 | Fier | |
| 6,142,873 | A | 11/2000 | Weiss et al. | |
| 6,142,874 | A | 11/2000 | Kodachi et al. | |
| 6,155,925 | A | 12/2000 | Giobbi et al. | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,233 | B1 | 1/2001 | Sunaga et al. | |
| 6,186,894 | B1 | 2/2001 | Mayeroff | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,217,447 | B1 | 4/2001 | Lofink et al. | |
| 6,220,959 | B1 | 4/2001 | Holmes, Jr. et al. | |
| 6,224,482 | B1 | 5/2001 | Bennett | |
| 6,224,483 | B1 | 5/2001 | Mayeroff | |
| 6,227,971 | B1 | 5/2001 | Weiss | |
| 6,231,442 | B1 | 5/2001 | Mayeroff | |
| 6,231,445 | B1 | 5/2001 | Acres | |
| 6,234,879 | B1 | 5/2001 | Hasegawa et al. | |
| 6,234,897 | B1 | 5/2001 | Frohm et al. | |
| 6,238,287 | B1 | 5/2001 | Komori et al. | |
| 6,251,013 | B1 | 6/2001 | Bennett | |
| 6,261,128 | B1 | 7/2001 | Heim et al. | |
| 6,261,177 | B1 | 7/2001 | Bennett | |
| 6,270,409 | B1 | 8/2001 | Shuster | |
| 6,270,411 | B1 | 8/2001 | Gura et al. | |
| 6,270,412 | B1 | 8/2001 | Crawford et al. | |
| 6,299,165 | B1 | 10/2001 | Nagano | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,311,976 | B1 | 11/2001 | Yoseloff et al. | |
| 6,312,334 | B1 | 11/2001 | Yoseloff | |
| 6,315,660 | B1 | 11/2001 | DeMar et al. | |
| 6,315,663 | B1 | 11/2001 | Sakamoto | |
| 6,328,649 | B1 | 12/2001 | Randall et al. | |
| 6,334,614 | B1 | 1/2002 | Breeding | |
| 6,334,864 | B1 | 1/2002 | Amplatz et al. | |
| 6,340,158 | B2 | 1/2002 | Pierce et al. | |
| 6,346,043 | B1 | 2/2002 | Colin et al. | |
| 6,347,996 | B1 | 2/2002 | Gilmore et al. | |
| RE37,588 | E | 3/2002 | Ornstein | |
| 6,358,147 | B1 | 3/2002 | Jaffe et al. | |
| 6,364,766 | B1 | 4/2002 | Anderson et al. | |
| 6,364,768 | B1 | 4/2002 | Acres et al. | |
| 6,368,216 | B1 | 4/2002 | Hedrick et al. | |
| 6,375,567 | B1 | 4/2002 | Acres | |
| 6,394,902 | B1 | 5/2002 | Glavich et al. | |
| 6,398,218 | B1 | 6/2002 | Vancura | |
| 6,398,644 | B1 | 6/2002 | Perrie et al. | |
| 6,443,452 | B1 * | 9/2002 | Brune | 273/143 R |
| 6,464,582 | B1 | 10/2002 | Baerlocher et al. | |
| 6,471,208 | B2 | 10/2002 | Yoseloff et al. | |
| 6,481,713 | B2 | 11/2002 | Perrie et al. | |
| 6,491,584 | B2 | 12/2002 | Graham et al. | |
| 6,533,273 | B2 | 3/2003 | Cole et al. | |
| 6,537,150 | B1 | 3/2003 | Luciano et al. | |
| 6,537,152 | B2 | 3/2003 | Seelig et al. | |
| 6,547,242 | B1 | 4/2003 | Sugiyama et al. | |
| 6,561,904 | B2 | 5/2003 | Loche et al. | |
| 6,565,436 | B1 | 5/2003 | Baerlocher | |
| 6,602,137 | B2 | 8/2003 | Kaminkow et al. | |
| 6,604,740 | B1 | 8/2003 | Singer et al. | |
| 6,612,574 | B1 | 9/2003 | Cole et al. | |
| 6,612,575 | B1 | 9/2003 | Cole et al. | |
| 6,638,164 | B2 | 10/2003 | Randall et al. | |
| 6,676,512 | B2 | 1/2004 | Fong et al. | |
| 6,712,694 | B1 | 3/2004 | Nordman | |
| 6,733,389 | B2 | 5/2004 | Webb et al. | |
| 6,805,349 | B2 | 10/2004 | Baerlocher et al. | |
| 6,811,486 | B1 | 11/2004 | Luciano, Jr. | |
| 6,863,608 | B1 | 3/2005 | LeMay et al. | |
| 6,869,360 | B2 | 3/2005 | Marks et al. | |
| 6,905,406 | B2 | 6/2005 | Kaminkow et al. | |
| 6,913,532 | B2 | 7/2005 | Baerlocher et al. | |
| 6,921,335 | B2 | 7/2005 | Rodgers et al. | |
| 6,955,600 | B2 | 10/2005 | Glavich et al. | |
| 7,011,581 | B2 | 3/2006 | Cole et al. | |
| 7,066,815 | B2 | 6/2006 | Walker et al. | |
| 7,291,068 | B2 * | 11/2007 | Bryant et al. | 463/25 |
| 7,300,351 | B2 | 11/2007 | Thomas | |
| 7,572,183 | B2 | 8/2009 | Olivas et al. | |
| 7,618,316 | B2 | 11/2009 | Cole et al. | |
| 7,749,074 | B2 | 7/2010 | Cole et al. | |
| 7,819,743 | B2 | 10/2010 | Olivas et al. | |
| 7,993,195 | B2 | 8/2011 | Belger et al. | |
| 2001/0009865 | A1 | 7/2001 | Demar et al. | |
| 2002/0010017 | A1 | 1/2002 | Bennett | |
| 2003/0003988 | A1 | 1/2003 | Walker et al. | |
| 2003/0036424 | A1 | 2/2003 | Baerlocher | |
| 2003/0060272 | A1 | 3/2003 | Glavich et al. | |
| 2003/0064786 | A1 | 4/2003 | Weiss | |
| 2003/0073483 | A1 | 4/2003 | Glavich et al. | |
| 2003/0104856 | A1 | 6/2003 | Wolf | |
| 2003/0146574 | A1 * | 8/2003 | Duhamel | 273/292 |
| 2003/0162585 | A1 | 8/2003 | Bigelow et al. | |
| 2003/0203753 | A1 | 10/2003 | Muir et al. | |
| 2004/0002372 | A1 | 1/2004 | Rodgers et al. | |
| 2004/0038731 | A1 | 2/2004 | Englman | |
| 2004/0048651 | A1 | 3/2004 | Vorias et al. | |
| 2004/0053657 | A1 | 3/2004 | Fiden et al. | |
| 2004/0053662 | A1 | 3/2004 | Pacey | |
| 2004/0053666 | A1 | 3/2004 | Vancura | |
| 2004/0053669 | A1 | 3/2004 | Gerrard et al. | |
| 2004/0053672 | A1 | 3/2004 | Baerlocher | |
| 2004/0072612 | A1 | 4/2004 | Rodgers et al. | |
| 2004/0137982 | A1 | 7/2004 | Cuddy et al. | |
| 2004/0147306 | A1 | 7/2004 | Randall et al. | |
| 2004/0162130 | A1 * | 8/2004 | Walker et al. | 463/16 |
| 2004/0266516 | A1 | 12/2004 | Thomas | |
| 2004/0266517 | A1 | 12/2004 | Bleich et al. | |
| 2005/0014556 | A1 | 1/2005 | Duhamel | |
| 2005/0014562 | A1 | 1/2005 | Fujimoto | |
| 2005/0049035 | A1 | 3/2005 | Baerlocher et al. | |
| 2005/0064926 | A1 | 3/2005 | Walker et al. | |
| 2005/0070354 | A1 | 3/2005 | Baerlocher et al. | |
| 2005/0075163 | A1 | 4/2005 | Cuddy et al. | |
| 2005/0233801 | A1 | 10/2005 | Baerlocher et al. | |
| 2005/0266917 | A1 | 12/2005 | Glavich et al. | |
| 2006/0003834 | A1 | 1/2006 | Okada | |
| 2006/0178188 | A1 | 8/2006 | LeMay et al. | |
| 2006/0189377 | A1 | 8/2006 | Gomez et al. | |
| 2008/0113705 | A1 * | 5/2008 | Moody et al. | 463/13 |
| 2008/0113779 | A1 | 5/2008 | Cregan | |
| 2008/0274798 | A1 | 11/2008 | Walker et al. | |
| 2008/0274808 | A1 | 11/2008 | Walker et al. | |
| 2010/0029367 | A1 * | 2/2010 | Englman et al. | 463/20 |
| 2010/0120524 | A1 * | 5/2010 | Rodgers et al. | 463/27 |

(56) References Cited

U.S. PATENT DOCUMENTS

2010/0124973 A1 5/2010 DeWaal et al.
2010/0210351 A1 8/2010 Berman
2010/0234095 A1* 9/2010 Cole et al. ........................ 463/20
2010/0292001 A1 11/2010 Bleich et al.
2011/0117989 A1* 5/2011 Kennedy et al. ................ 463/20

* cited by examiner

GAMING SYSTEM, GAMING DEVICE, AND METHOD FOR PROVIDING A REPLAY OF PREVIOUSLY PLAYED GAMES

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

In certain of these gaming machines, regulations require that the results or outcomes of one or more of the previous played game are stored in a memory device. The storing of the outcomes enables a regulator or gaming machine operator, such as casino personal, to access the results of a predetermined number of previous plays to monitor game play.

Certain known gaming machines utilize a memory device to flag information from one game or gaming sequence to be regenerated in one or more subsequent games or gaming sequences. One known gaming machine uses a memory device to store one or more symbols generated from a spin of the reels for subsequent use, such as in the next spin. Another one of these gaming machines enables the player to select a symbol to save and then enables the player to retrieve this symbol in a subsequent game or gaming sequence. These games attempt to enhance the player experience by causing the outcome of one game to influence the outcome of a subsequent game.

Additionally, other known gaming machines utilize a memory device and a history display to display to the player the results of previous plays of the game. One of these gaming machines shows the time interval since the last occurrence of a particular outcome or the frequency of the occurrence of a particular outcome.

There is a continuing need to increase the level of excitement and entertainment for people playing gaming machines. It is thus desirable to provide players with new features for gaming machines, where the new features utilize a memory device to regenerate, redisplay and award players the outcomes of one or more previous plays of a game.

SUMMARY

The present disclosure relates generally to gaming systems, gaming devices, and methods for dynamically maintaining a set of previously generated game outcomes and providing a replay of one or more of the previously generated game outcomes.

In various embodiments, the gaming system disclosed herein and specifically a central controller, central server or remote host, stores, flags or tracks the game outcomes (or data associated with such game outcomes) of a plurality of independent plays of one or more games, such as one or more bonus or secondary games, of one or more gaming devices. In these embodiments, the gaming system dynamically maintains the stored game outcomes such as by replacing one or more stored less lucrative game outcomes with one or more subsequently generated more lucrative game outcomes. Upon an occurrence of a game outcome regeneration triggering event, the gaming system regenerates or replays one or more of the stored game outcomes. Such a configuration increases player enjoyment by providing the player an opportunity to substantially increase their winnings by providing individual game outcomes or awards more than one time.

In one embodiment, the gaming system stores, flags or tracks a designated quantity of generated game outcomes in a set or pool of stored game outcomes. In this embodiment, as each game outcome is generated, the gaming system determines whether or not to include such a generated game outcome in the set or pool of stored game outcomes. This determination is based, at least in part, on a quantity of stored game outcomes currently in the set (i.e., are less than the designated quantity of game outcomes currently stored). This determination is further based, at least in part, on a comparison of the generated game outcome to the stored game outcomes currently in the set (i.e., is the generated game outcome associated with an award value greater than the currently stored game outcome associated with the lowest award value).

If the determination is not to store the generated game outcome in the set of stored game outcomes (i.e., the set of stored game outcomes already includes the designated quantity of game outcomes and the generated game outcome is associated with an award value less than the currently stored game outcome associated with the lowest award value), the gaming system discards and does not store the generated game outcome.

On the other hand, if the determination is to store the generated game outcome in the set of stored game outcomes and the set of stored game outcomes already includes the designated quantity of game outcomes, the gaming system of this embodiment removes or discards one of the previously stored game outcomes in the set of stored game outcomes and stores the generated game outcome in the set of stored game outcomes. That is, because the set of stored game outcomes includes a designated quantity of game outcomes, the addition of another generated game outcome results in the removal of a previously generated game outcome. It should be appreciated that the repeated discarding of previously stored game outcomes associated with certain award values and replacing such discarded game outcomes with other game outcomes associated with greater award values causes the set of stored game outcomes to increasingly include game outcomes associated with more lucrative award values until the set only includes stored game outcomes associated with the most lucrative award values. Put differently, if a paytable of a game includes a maximum award value, then with enough time (i.e., enough plays of the game), the game outcome associated with this maximum award value will be generated the designated quantity of times such that each of the designated quantity of stored game outcomes in the set of game outcomes is associated with this maximum award value. Accordingly, this embodiment provides that eventually each occurrence of the game outcome regeneration triggering event will have an average expected payout of a maximum available award value which increases player enjoyment by providing the player an opportunity to win more lucrative awards the longer the player plays the game.

In one embodiment, to account for the above-described increasing award values associated with the stored game outcomes in the set of stored game outcomes, the gaming system periodically determines, independent of any generation of any game outcomes, to discard one or more stored game outcomes from the set of stored game outcomes. In this embodiment, one or more of the game outcomes stored in the set of stored game outcomes expire or lapse, such as based on time or based on a number of games played, wherein once expired, the gaming system removes such previously stored game outcomes from the set of stored game outcomes. Such an embodiment provides that which game outcomes available to be regenerated is based, at least in part, on when the game outcome regeneration triggering event occurs relative to when one or more stored game outcomes expire. Accordingly, this embodiment provides that different occurrences of the game outcome regeneration triggering event will have different average expected payouts based on which game outcomes are currently stored in the set of game outcomes (and which game outcomes have expired and been removed from the set of game outcomes). This configuration increases excitement for players because players will want the game outcome regeneration triggering event to occur prior to the expiration (and subsequent removal from the set of game outcomes) of any stored game outcomes associated with any lucrative awards.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
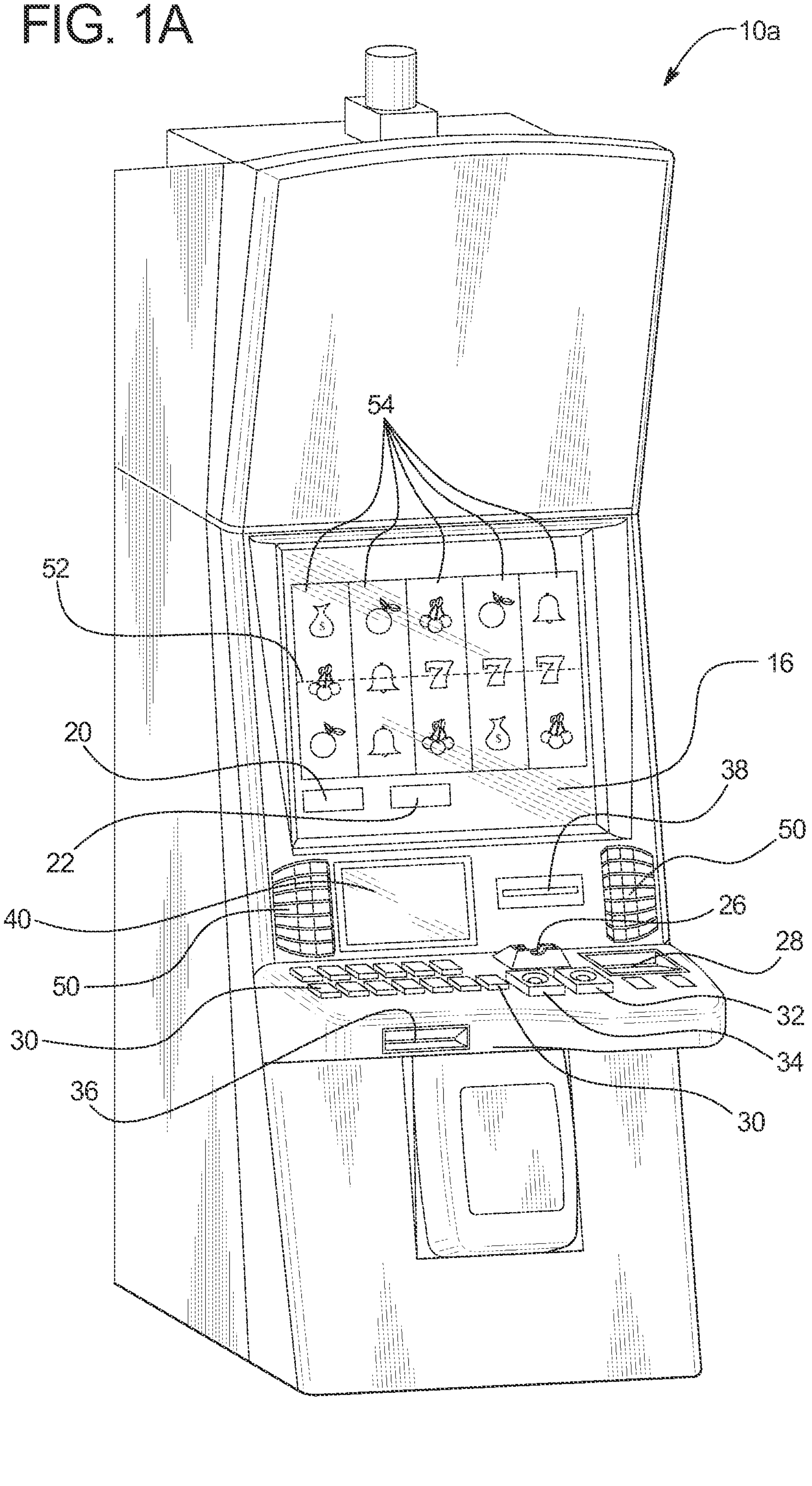
FIGS. 1A and 1B are perspective views of example alternative embodiments of the gaming device of the present disclosure.
Figure 1B:
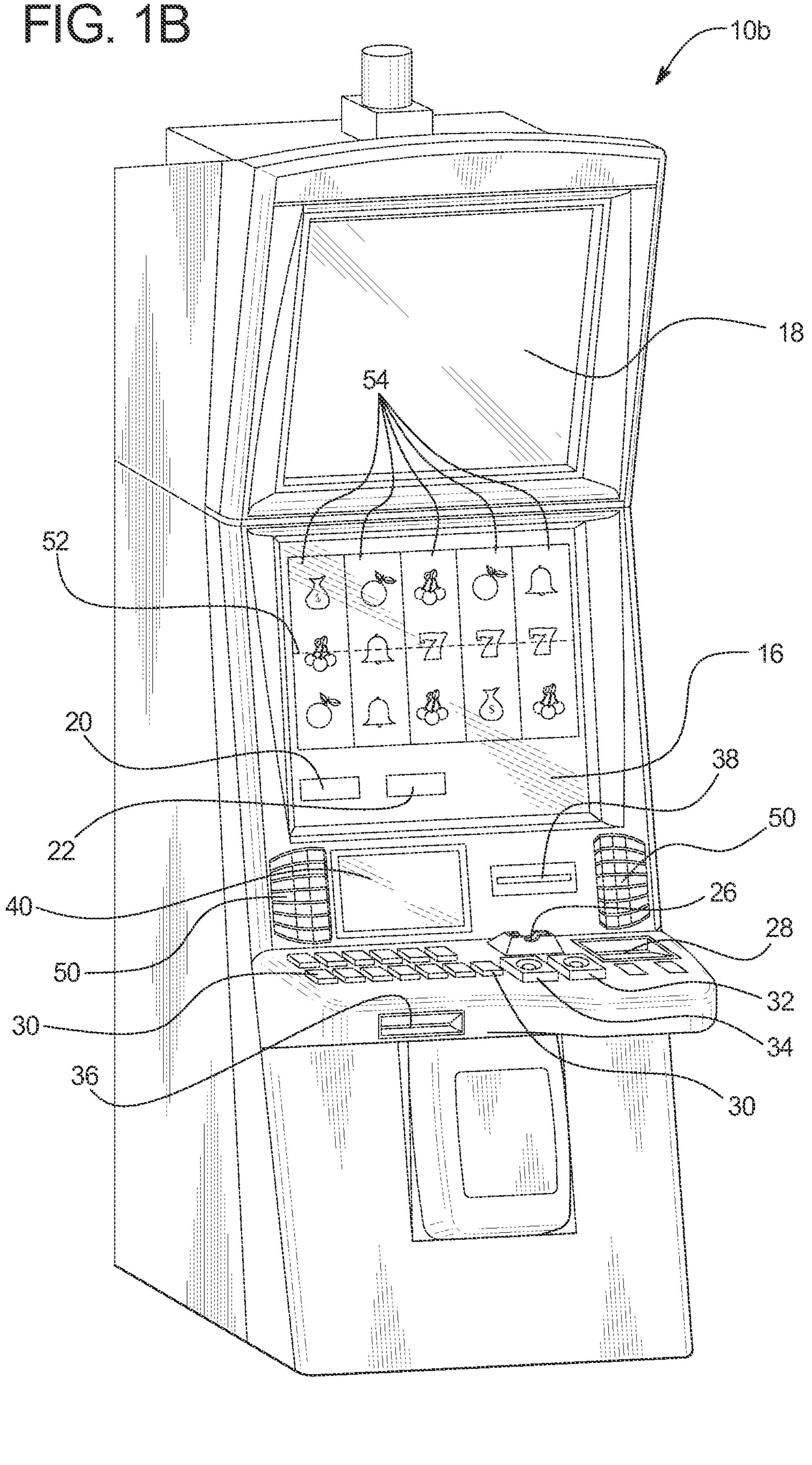

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
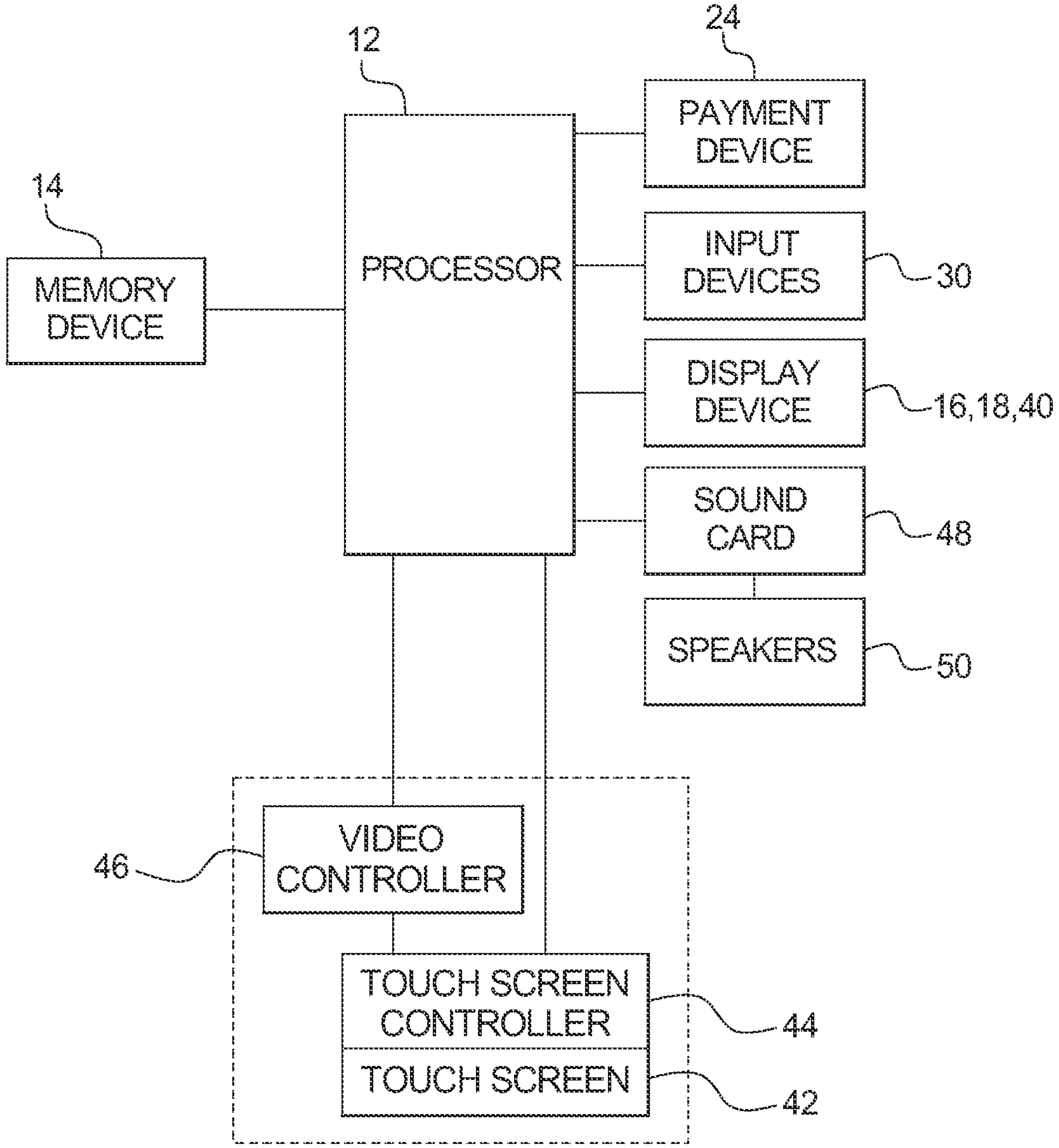
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game is implemented as a base or primary game.

In one embodiment, as illustrated in FIGS. 1A and 1B, a base or primary game may be a slot game with one or more paylines 52. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the gaming device enables a player to wager on one or more of such paylines to activate such wagered on paylines.

In another embodiment wherein one or more paylines are formed between at least two symbol display positions which are adjacent to each other, the gaming device enables a player to wager on and thus activate a plurality of symbol display positions. In this embodiment, one or more paylines which are formed from a plurality of adjacent active symbol display positions on a requisite number of adjacent reels are activated.

In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
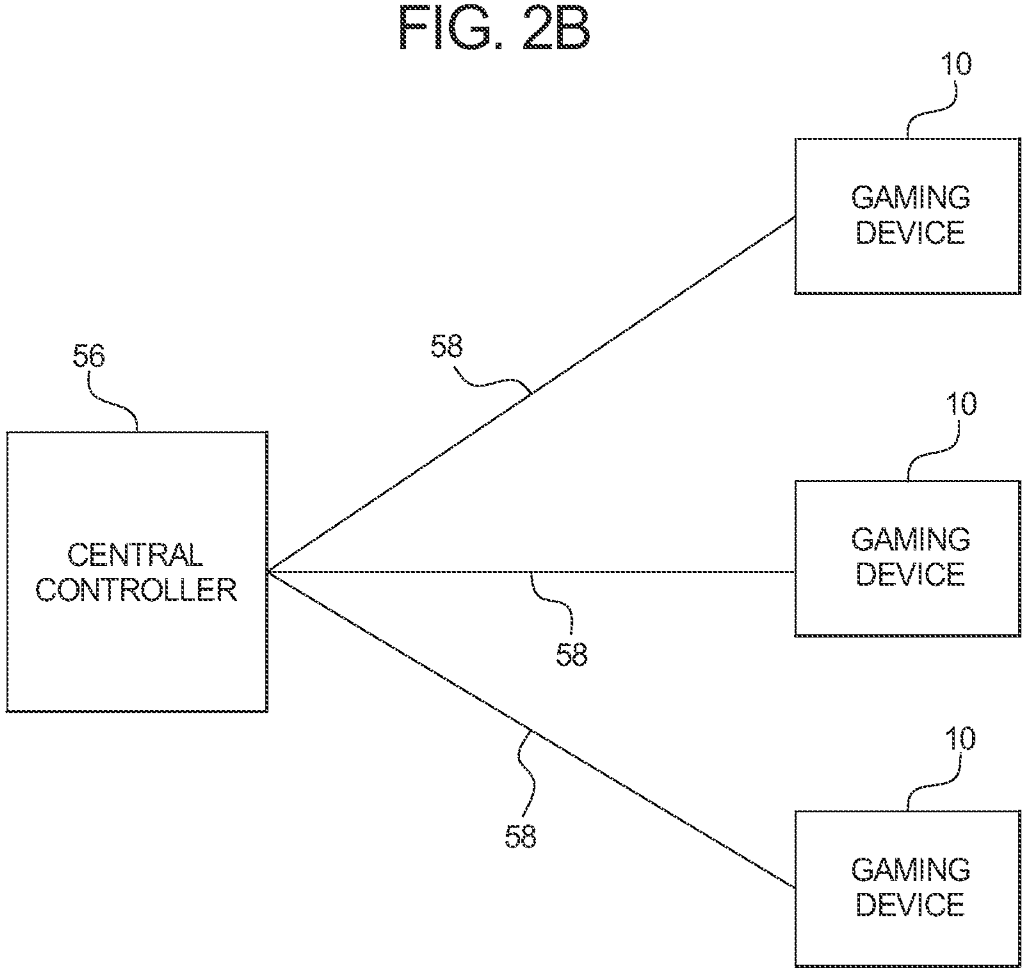
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Replaying Games

Figure 3:
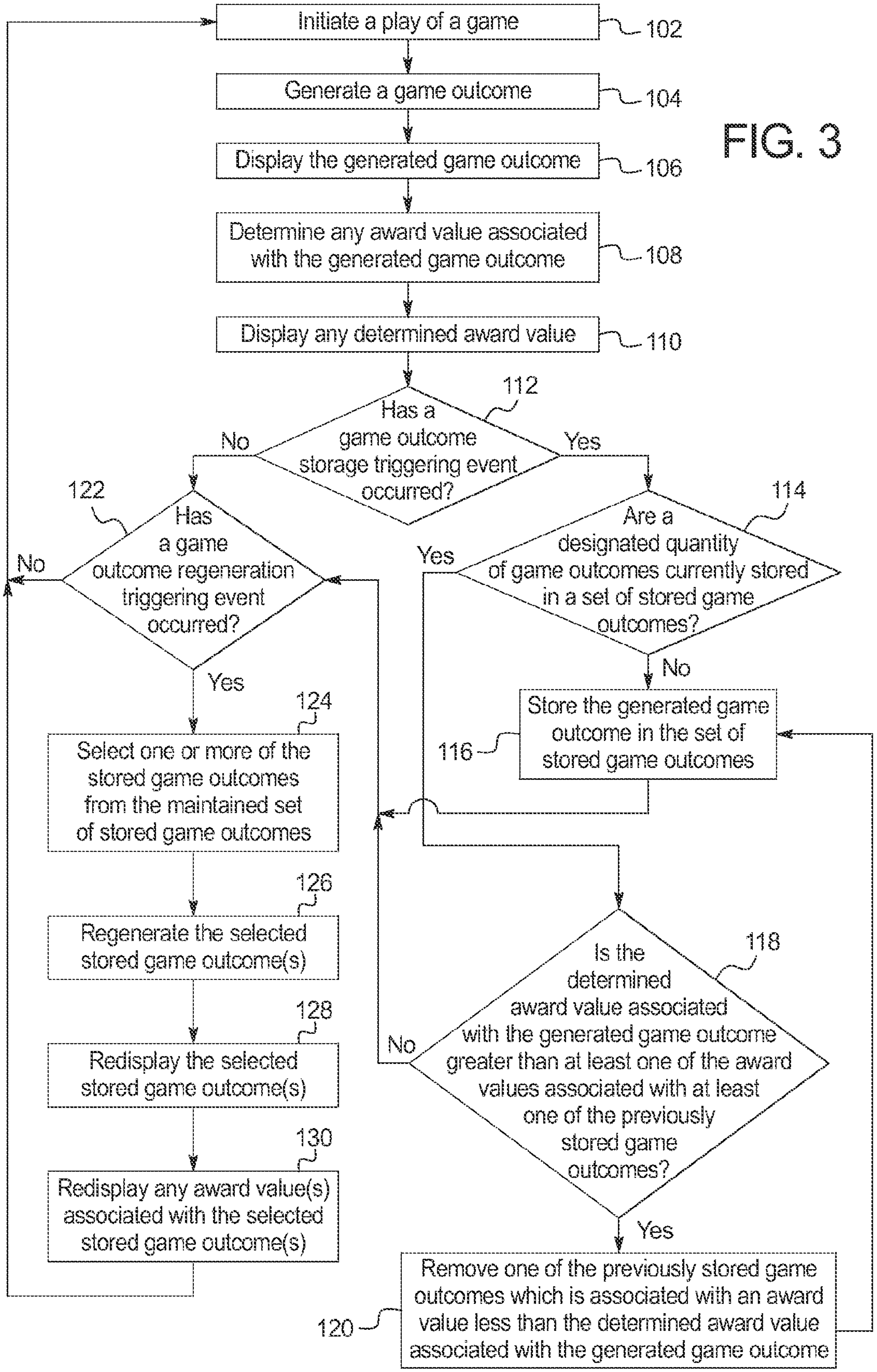
FIG. 3 is a flow chart an example process for operating a gaming system providing one or more regenerated game outcomes from a pool of stored game outcomes.

Referring now to FIG. 3, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

As seen in FIG. 3, in one embodiment, the gaming system initiates a play of a game as indicated in block 102. In one such embodiment, the initiated game is a primary game configured to operate upon the placement of a wager as described above. In another embodiment, the initiated game is a bonus or secondary game configured to operate upon the occurrence of a secondary game triggering event as described above. In association with the play of the initiated game, as described in more detail above, the gaming system generates a game outcome, displays to the player the generated game outcome, determines any award value associated with the generated game outcome and displays to the player any determined award value as indicated in blocks 104, 106, 108 and 110. For example, the gaming system generates a game outcome associated with an award value of fifty credits.

In addition to determining any awards in association with the play of the game, the gaming system determines if a game outcome storage triggering event has occurred as indicated in diamond 112. In one embodiment, a game outcome storage triggering event occurs based on at least one displayed event occurring in association with a play of a game, such as a designated symbol combination being generated. In another embodiment, a game outcome storage triggering event occurs independent of any displayed events in any plays of any games. In one embodiment, the game outcome storage triggering event occurs in association with each game played. That is, in this embodiment, the gaming system determines whether each generated game outcome should be stored, tracked or flagged. In another embodiment, the game outcome storage triggering event occurs in association with less than each game played.

If the game outcome storage triggering event occurred, as indicated in diamond 114, the gaming system determines whether a designated quantity of game outcomes are currently stored in a set or pool of stored game outcomes. In this embodiment, to insure that only certain of the generated game outcomes are available to be subsequently regenerated (as described below), the gaming system maintains a limited quantity of generated game outcomes in the set or pool of stored game outcomes.

If the set or pool of stored game outcomes includes a quantity of stored game outcomes less than the designated quantity of game outcomes, then regardless of the award value associated with the currently generated game outcome, the gaming system stores the generated game outcome (or data associated with the generated game outcome) in the set or pool of stored game outcomes as indicated in block 116. For example, a set or pool of stored game outcomes (in this case stored plays of a bonus game) has the capacity to be associated with ten previously generated game outcomes and prior to the generation of the game outcome associated with an award value of fifty credits (as seen at a first point in time 150*a* of FIG. 4), the set or pool currently includes five stored game outcomes. In this example, (as seen at the second point in time 150*b* of FIG. 4), the gaming system stores in the set or pool the generated game outcome (or data associated with the generated game outcome) associated with the award value of fifty credits.

Turning back to FIG. 3, if the set or pool of stored game outcomes includes a quantity of stored game outcomes greater than or equal to the designated quantity of game outcomes, as indicated in block 118, the gaming system determines whether the determined award value associated with the generated game outcome is greater than at least one of the award values associated with at least one of the previously stored game outcomes. That is, to accommodate the quantity of stored game outcomes representing a quantity of the most lucrative or top game outcomes, the gaming system compares the currently generated game outcome to one or more of the previously generated and currently stored game outcomes to determine which game outcomes are associated with higher award values.

If the determined award value associated with the generated game outcome is greater than at least one of the award values associated with at least one of the previously stored game outcomes, the gaming system removes and discards one of the previously stored game outcomes which is associated with an award value less than the determined award value associated with the generated game outcome as indicated in block 120. Following such removal, the gaming system proceeds to block 116 and stores the generated game outcome (or data associated with the generated game outcome) in the set or pool of stored game outcomes. That is, because the set of stored game outcomes includes a designated quantity of game outcomes, once the pool includes the designated quantity of game outcomes, the addition of another generated game outcome results in the removal of a previously generated game outcome.

Figure 4:
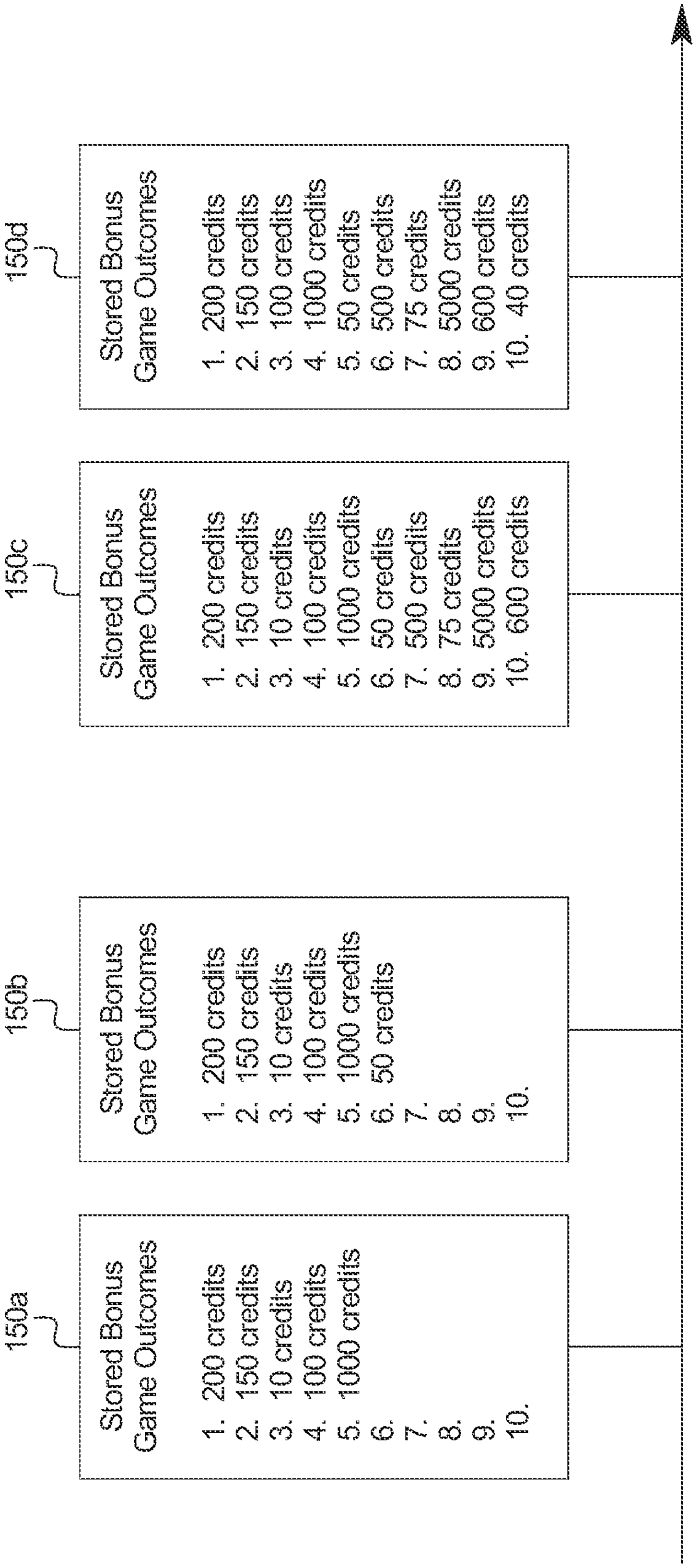
FIG. 4 is a timeline of one embodiment of the gaming system disclosed herein illustrating different outcomes stored in the pool of stored game outcomes at different points in time.

For example, at a third point in time 150*c* of FIG. 4, if the set or pool of stored game outcomes already includes the maximum capacity of ten stored game outcomes and the gaming system determines that an award value of forty credits associated with a currently generated game outcome is greater than the ten credits award value associated with the lowest valued stored game outcome, the gaming system removes and discards the stored game outcome (which is associated with the award value of ten credits) from the set or pool of stored game outcomes. In this example, as seen at the fourth point in time 150*d* of FIG. 4, the gaming system replaces this removed game outcome with the generated game outcome associated with the award value of forty credits. It should be appreciated that the replacement of the stored game outcome associated with an award value of ten credits with the game outcome associated with an award value of forty credits caused an increase of the average expected value of the stored game outcome from approximately 768 credits (or (200+150+10+100+1000+50+500+75+5000+600)/10) at the third point in time to approximately 771 credits (or (200+150+100+1000+50+500+75+5000+600+40)/10) at the fourth point in time.

It should be further appreciated that the repeated discarding of a previously stored game outcome associated with one award value and replacing such discarded game outcome with another game outcome associated with a greater award value causes the set of stored game outcomes to increasingly include game outcomes associated with more lucrative award values until the set only includes stored game outcomes associated with the most lucrative award values. That is, if a paytable of a game includes a maximum award value, then with enough plays of the game (i.e., enough opportunities to generate an outcome associated with this maximum award value), the game outcome associated with this maximum award value will be generated the designated quantity of times such that each of the designated quantity of game outcomes in the set of game outcomes is associated with the maximum award value. For example, if a pick game is associated with a maximum award value of ten-thousand credits, then given enough time, the expected award value of the replay of this game will be ten-thousand credits because all the stored game outcomes associated with the lower award values will have been replaced with stored game outcomes associated with the maximum award value of ten-thousand credits. Accordingly, this embodiment provides that eventually each occurrence of the game outcome regeneration triggering event will have an average expected payout of a maximum available award value which increases player enjoyment by providing the player an opportunity to win more lucrative awards.

In addition to determining whether or not to store a currently generated game outcome, the gaming system also determines whether a game outcome storage triggering event has occurred. Specifically, as seen in FIG. 3, after: (i) storing the generated game outcome (or data associated with the generated game outcome) in the set or pool of stored game outcomes, or (ii) determining that the determined award value associated with the generated game outcome is less than or equal to (i.e., not greater than) each of the award values associated with each of the previously stored game outcomes, or (iii) determining that the game outcome storage triggering event does not occur, the gaming system determines whether a game outcome regeneration triggering event has occurred as indicated in diamond 122. In one embodiment, a game outcome regeneration triggering event occurs based on at least one displayed event occurring in association with a play of a game, such as a designated symbol combination being generated. In another embodiment, a game outcome regeneration triggering event occurs independent of any displayed events in any plays of any games.

If the game outcome regeneration triggering event does not occur, the gaming system returns to block 102 and proceeds as described above for any additionally initiated games.

On the other hand, if the game outcome regeneration triggering event occurs, the gaming system selects one or more of the stored game outcomes from the maintained set or pool of stored game outcomes as indicated in block 124. In one embodiment, the gaming system randomly selects one of the stored game outcome from the set or pool of game outcomes. In another embodiment, the gaming system selects one of the stored game outcomes based on one or more player selections. In this embodiment, the gaming system associates a plurality of stored game outcomes from a set or pool with a plurality of selections. The gaming system then enables the player to pick one of the selections, wherein the stored game outcome associated with the player picked selection is the selected stored game outcome. In another embodiment, the gaming system requests a stored game outcome from the pool of stored game outcomes. In one such embodiment, a gaming devices requests a stored game outcome by sending certain data, such as gaming device data, game played data, location data, player identification data, denomination data, wager data, paylines played data, credits wagered per payline, to the remote host. In this embodiment, the remote host then queries the pool of stored game outcome to determine a stored game outcome that is compatible with the requested data. Upon determining a compatible stored game outcome, the remote host selects the stored game outcome.

Following the selection of one or more stored game outcomes from the pool of stored game outcomes, the gaming system then regenerates the selected stored game outcome(s), redisplays to the player the selected stored game outcome(s) and redisplays to the player any award value(s) associated with the selected stored game outcome(s) indicated in blocks 126, 128 and 130. In one embodiment, as shown in FIG. 3, following this regeneration of a previously generated and subsequently stored game outcome, the gaming system returns to block 102 and proceeds as described above for any additionally initiated games. In another embodiment (not shown), following this regeneration of a previously generated and subsequently stored game outcome, the gaming system returns to block 112 and proceeds as described above. In another embodiment (not shown), following the regeneration of a previously generated and subsequently stored game outcome, the gaming system returns to block 122 and proceeds as described above.

In one embodiment, as described above, the gaming system repeatedly discards previously stored game outcomes with different game outcomes associated with greater award values. In this embodiment, as described above, such continual replacement causes the set of stored game outcomes to increasingly include game outcomes associated with more lucrative award values until the set only includes stored game outcomes associated with the most lucrative award values. In one such embodiment, because each occurrence of the game outcome regeneration triggering event will eventually be associated with a maximum award value, the gaming system escrows any award value provided to the player for any regenerated game outcome that is less than the maximum award value. In different embodiments, the gaming system subsequently utilizes this escrowed amount to fund one or more bonus games or fund one or more progressive awards. For example, if a maximum award value for a play of a game is ten-thousand credits and the player is provided an award value of eight-thousand credits associated with a regenerated game outcome, the gaming system escrows the two-thousand credit difference between the actual award value provided and the theoretical maximum award value. Such a configuration thus provides that regardless of when a stored game outcome is regenerated (i.e., before or after the point in time that each of the stored game outcomes are associated with the maximum award value), the player is still provided the benefit of the maximum award value.

In another embodiment, to account for these increasing award values associated with the game outcomes in the set of stored game outcomes, the gaming system periodically determines, independent of any generation of any game outcomes, to discard one or more stored game outcomes from the set of stored game outcomes. Put differently, by periodically removing stored game outcomes, the gaming system of this embodiment increases the probability that new generated game outcomes will be stored in the set or pool of stored game outcomes.

In one such embodiment, one or more of the game outcomes stored in the set of stored game outcomes expire or lapse based on time, wherein once expired, the gaming system removes such previously stored game outcomes from the set of stored game outcomes. In this embodiment, the set or pool of stored game outcomes is limited to the game outcomes generated in a designated span or amount of time, such as the last day, the last week or the last month, wherein the gaming system utilizes the timestamp associated with each stored game outcome to determine whether that stored game outcome remains eligible to remain in the set or pool of stored game outcomes. It should be appreciated that in this embodiment: (i) the more games played in the designated span of time, the greater the average expected award value of the stored game outcomes of the set or pool (i.e., more games played equates to more opportunities to store game outcomes associated with lucrative award values); and (ii) the less games played in the designated span of time, the lower the average expected award value of the stored game outcomes of the set or pool (i.e., less games played equates to less opportunities to store game outcomes associated with lucrative award values).

In another such embodiment, one or more of the game outcomes stored in the set of stored game outcomes expire or lapse based on a quantity or number of games played, wherein once expired, the gaming system removes such previously stored game outcomes from the set of stored game outcomes. In this embodiment, the set or pool of stored game outcomes is limited to the game outcomes generated in a designated quantity of games played, such as the last ten games played. It should be appreciated that the average expected award value of the stored game outcomes of the set or pool of this embodiment is unaffected by the quantity of games played in any designated amount of time and thus remains within a range of average expected award values. For example, if the pool size is ten stored outcomes and the age limit is one-hundred played games, the average expected award value of the pool would be the average of the top 10% possible award values.

It should be appreciated that such expiring stored game outcome embodiments provide that which game outcomes available to be regenerated is based, at least in part, on when the game outcome regeneration triggering event occurred relative to when one or more stored game outcomes expire. Accordingly, these embodiments provide that different occurrences of the game outcome regeneration triggering event will have different average expected payouts based on which game outcomes are currently stored in the set of game outcomes (and which game outcomes have expired and been removed from the set of game outcomes). This configuration increases excitement for players because players will want the game outcome regeneration triggering event to occur prior to the expiration (and subsequent removal from the set of game outcomes) of any game outcomes associated with any lucrative awards. For example, if the stored bonus game outcome of five-thousand credits of FIG. 4 is associated with a duration of twenty plays before that stored bonus game outcome expires (and is removed from the set of stored game outcomes), the anticipation of whether or not a game outcome regeneration triggering event occurs within the twenty plays subsequent to the storage of the bonus game outcome of five-thousand credits provides an increased level of excitement for certain players.

In one embodiment, each of the stored game outcomes expire at the same rate (i.e., after the same quantity of games played or after the same quantity of time). In one such embodiment, the stored game outcomes are removed from the pool in a last in-last out configuration. In another embodiment, a plurality of the stored game outcomes expire at the same rate and a plurality of the stored game outcomes expire at different rates. In another embodiment, each of the stored game outcomes expire at different rates. In one such embodiment, the stored game outcomes are removed from the pool in a first in-first out configuration.

In one embodiment, the gaming device tracks, flags or stores suitable game outcome data related to the generated game outcome. In one such embodiment, the stored game outcome data includes the gaming system storing or flagging the generated game outcome and the generated symbols that are associated with the generated game outcome. In this embodiment, upon an occurrence of a game outcome regeneration triggering event, the gaming system regenerates the flagged symbols which correspond with the regenerated game outcome. In another such embodiment, the stored game outcome data includes the gaming system storing the generated game outcome and multimedia data associated with the play of the game which generated the game outcome. In this embodiment, the gaming system records, as the game is played, the audio of the game and the video of the game and then stores the resulting multimedia file along with any associated metadata (e.g., theme id, machine id, timestamp, provided award values, and/or wager amount). It should be appreciated that storing the audio/video of the play of the game and any associated metadata provides that stored games can be subsequently regenerated (as described below) at any suitable gaming device regardless of whether that gaming device is or is not theme-compatible with the stored game and regardless of whether that gaming device operates on the same platform (or even is from the same gaming device manufacturer) as the gaming device which initially played the stored game. It should be further appreciated that since certain games include one or more aspects of player interaction, recording the game as a video will ensure that the same game outcome occurs each time the game is replayed.

In another embodiment, the stored game outcome data includes the gaming system storing or flagging the generated game outcome and not the generated symbols that are associated with the generated game outcome. In this embodiment, upon an occurrence of a game outcome regeneration triggering event, the gaming system regenerates one or more of the flagged game outcomes and displays to the player a symbol or symbol combination which is associated with the regenerated flagged game outcome. It should be appreciated that in this embodiment, the regenerated symbols displayed to the player may not correspond with the symbols initially displayed to the player as associated with the initially flagged game outcome.

In another embodiment, the stored game outcome data includes the gaming system storing or flagging the generated symbols and not the generated game outcome associated with the generated symbols. In this embodiment, upon an occurrence of a game outcome regeneration triggering event, the gaming system regenerates the flagged symbols and determines a game outcome which corresponds with the regenerated symbols. It should be appreciated that in this embodiment, the generated game outcome which corresponds with the regenerated symbols will correspond to the game outcome which was not initially flagged.

In another embodiment, the stored game outcome data includes any suitable data or information which relates or corresponds to the generated game outcome. In one example of this embodiment, upon an occurrence of a game outcome regeneration triggering event, the gaming system displays a table summarizing the regenerated game outcomes and provides the regenerated game outcomes to the player. In another example of this embodiment, upon an occurrence of a game outcome regeneration triggering event, the gaming system displays a reproduction of one or more previously displays screen shots and provides the regenerated game outcomes to the player.

In another embodiment, the gaming system stores the actual generated random number(s) used to generate the stored game outcome and any player input associated with the play of the game. While this embodiment is associated with less gaming system storage space and further facilitates faster transmission of data to and from the remote host, this embodiment is also associated with additional computations in the regeneration of a stored game outcome. That is, the storage of one or more random numbers associated with a game outcome facilitates that the subsequent regeneration or replay of the stored game accesses the replayed games resources, binaries and/or autoplay functionality (if the stored game includes any player inputs) to recreate the stored play of the game from an id tag, a set of random numbers and any stored player inputs.

In one embodiment, as described above, the gaming system stores each game outcome in the set or pool of stored game outcomes until the designated quantity is reached. In another embodiment, the gaming system stores winning game outcomes and discards any losing game outcomes. In this embodiment, even if the set of stored game outcomes includes less than the designated quantity of game outcomes, if a generated game outcome is a losing game outcome, the gaming system will not store such a losing game outcome.

In one embodiment, as described above, the gaming system maintains one set or pool of stored game outcomes. In one such embodiment wherein the gaming system maintains a set or pool of stored game outcomes, the gaming system stores the game outcomes from monetary wagering games and non-monetary social media games in the one set or pool. In this embodiment, the gaming system converts monetary credits and non-monetary points back and forth such that a game award of one-thousand virtual points is stored and subsequently replayed as a monetary wagering game (i.e., a game played in a gaming establishment) as an award of one-thousand credits or subsequently replayed as a non-monetary social media game (i.e., a game not in a gaming establishment) as an award of one-thousand virtual points.

In another embodiment, the gaming system maintains a plurality of sets or pools of stored game outcomes. In this embodiment, the gaming system first selects one of the pools of stored game outcomes and then selects a stored game outcome from the selected pool of stored game outcomes.

In one such embodiment, a plurality of the maintained pools are each associated with a different average award value (i.e., an average of the award values associated with the stored game outcomes of each of a plurality of pools are different). In this embodiment, upon an occurrence of a game outcome regeneration triggering event, the gaming system selects one of the pools of stored game outcomes associated with one of the average expected award values, wherein the selection of the pool is based on one or more factors, such as based on the player's recent wagering activity.

In another such embodiment, a plurality of the maintained pools are each associated with different ranges of award values (i.e., a range of the award values associated with the stored game outcomes of each of a plurality of pools are different). In another embodiment, the gaming system maintains a plurality of sets or pools of stored game outcomes for each of a plurality of different wager amounts or wager amount ranges. In this embodiment, upon an occurrence of a game outcome regeneration triggering event for a play of a game associated with a wager amount, the gaming system selects one of the stored game outcomes from the pool of stored game outcomes maintained for the same wager amount (or for a designated range of wager amounts including the wager amount associated with the play of the game). For example, if a player is wagering ten credits per game played and a game outcome regeneration triggering event occurs in association with one of the games played, the gaming system selects a stored game outcome from the maintained ten credits wagered pool of stored game outcomes.

In one such embodiment, the gaming system maintains an individual pool of stored game outcomes for each player. In another such embodiment, the gaming system maintains a plurality of pools of stored game outcomes for each player. In these embodiment, the more frequently a player plays one or more games, the greater the likelihood that the player will win lucrative game outcomes and thus the greater average award value of the stored game outcomes of the player's pool(s).

In another embodiment, the gaming system maintains a plurality of sets or pools of stored game outcomes for each player for each of a plurality of different wager amounts or wager amount ranges. In this embodiment, upon an occurrence of a game outcome regeneration triggering event for a play of a game associated with a wager amount, the gaming system selects one of the stored game outcomes from the pool of stored game outcomes maintained for the same wager amount for that player (or for a designated range of wager amounts including the wager amount associated with the play of the game). For example, if a player is wagering ten credits per game played and a game outcome regeneration triggering event occurs in association with one of the games played, the gaming system selects a stored game outcome from the ten credits wagered pool maintained for that player.

In another embodiment, the gaming system maintains a set or pool of stored game outcomes for a plurality of different types of games, such as different types of bonus games. In another embodiment, the gaming system maintains a set or pool of stored game outcomes for each individual type of game, such as a pool of stored game outcomes for a wheel bonus game. In another embodiment, the gaming system maintains a plurality of sets or pools of stored game outcomes for a plurality of different types of games, such as a pool of stored game outcomes for a wheel bonus game and a pool of stored game outcomes for a selection bonus game.

In one embodiment, the gaming system maintains a set or pool of stored game outcomes for the games associated with a gaming device, such as a pool of stored game outcomes for a wheel bonus game associated with a gaming device and also for a selection bonus game associated with the gaming device. In another embodiment, the gaming system maintains a set or pool of stored game outcomes for each individual type of game associated with a gaming device, such as a pool of stored game outcomes for a wheel bonus game associated with a gaming device and another pool of stored game outcomes for a selection bonus game associated with the gaming device.

In another embodiment, the gaming system maintains a plurality of sets or pools of stored game outcomes for different game themes associated with a gaming establishment (or associated with a plurality of gaming establishment). In another embodiment, the gaming system maintains a plurality of sets or pools of stored game outcomes for each gaming device or each group of gaming devices.

In another embodiment, the gaming system maintains a set or pool of stored game outcomes for a plurality of players. In this embodiment, one or more game outcomes are stored in association with a play of a game by a first player and regenerated in association with a play of a game by a second, different player. Such a configuration provides that one or more game outcomes are replayed or regenerated across a plurality of different players. In one such embodiment, different sets or pools of stored game outcomes are associated with different players, such as a group of players identified as a team, a group of players identified as friends. In different embodiments, different set or pools of stored game outcomes are associated with different groups of related players, such as each of the players that played a specific game, each of the player's currently at a gaming establishment or each of the players enrolled in a gaming tournament.

In one embodiment, upon an occurrence of a game outcome regeneration triggering event, the gaming system determines an award value to provide to the player in association with a selected stored game outcome. In this embodiment, upon the determination of an award value to provide to the player, the gaming system selects, based on the determined award value, one of the stored game outcomes from the pool of stored game outcomes. The gaming system then regenerates the selected stored game outcome as described above. In one such embodiment, different types of game outcome regeneration triggering events are associated with different award values (or different ranges of award values) such that, as described below, the gaming system selects which of the pools of stored game outcomes to pick a stored game outcome from based on which game outcome regeneration triggering event occurs.

In one such embodiment, the gaming system accesses a set or pool of stored game outcomes wherein each stored outcome is associated with an award value equal to (or within a designated range of) the determined award value. For example, if the gaming system determines an award value of $10 to provide to the player as a regenerated game outcome, then the gaming system selects a set or pool of stored game outcomes wherein each stored game outcome is associated with an award value of $10. The gaming system of this example then selects one of the stored game outcomes from the selected pool and regenerates the selected stored game outcome. In this example, the regenerated game outcome will be associated with the same $10 award value as the award value determined upon the occurrence of a game outcome regeneration triggering event.

In another such embodiment, the gaming system accesses a set or pool of stored game outcomes wherein the pool is associated with an average expected award value equal to (or within a designated range of) the determined award value. In this embodiment, because the regenerated game outcome is selected from a pool of stored game outcomes associated with an average expected award value of the determined award value (i.e., one or more awards values associated with one or more of the stored game outcomes may be greater than the average and one or more award values associated with one or more of the stored game outcomes may be less than the average), upon the occurrence of a game outcome regeneration triggering event, the selected game outcome may be associated with a value the same as or different than the selected award value. For example, if the gaming system determines an award value of $10 to provide to the player as a regenerated game outcome, then the gaming system selects a set or pool of stored game outcomes wherein the set of stored game outcomes is associated with an award expected award value of $10. In this example, the gaming system then selects a stored game outcome associated with an award value of $15 to provide to the player.

In another such embodiment, the gaming system accesses a set or pool of stored game outcomes wherein the pool is associated with an average expected award value equal to (or within a designated range of) the determined award value. In this embodiment, the gaming system associates a plurality of stored game outcomes from the accessed set or pool with a plurality of selections. The gaming system then enables the player to pick one of the selections, wherein the stored game outcome associated with the player picked selection is the selected stored game outcome. In this embodiment, as described above, because the regenerated game outcome is selected from a pool of stored game outcomes associated with an average expected award value of the determined award value, upon the occurrence of a game outcome regeneration triggering event, the selected game outcome may be associated with a value the same as or different than the selected award value.

In another embodiment, the gaming system utilizes one or more progressive awards to determine when a game outcome regeneration triggering event occurs and/or to fund such regenerated game outcomes. In one embodiment, the gaming system maintains one or more hidden or background progressive awards (i.e., progressive awards which are unknown to the player). In one such embodiment, when a progressive award triggering event occurs, such as a hidden progressive award incrementing to a progressive award hit value, the gaming system selects a stored game outcome and regenerates the selected game outcome, wherein the selected game outcome is associated with an award value equal to (or within a designated range of) the value of the hidden progressive award. For example, if a hidden progressive award increments to a progressive award hit value of $100, the gaming system selects a stored game outcome associated with an award value of $100 and then regenerates this selected game outcome. In another such embodiment, when a progressive award triggering event occurs, the gaming system selects a stored game outcome and regenerates the selected game outcome, wherein the selected game outcome is selected from a pool having an average expected award value equal to (or within a designated range of) the value of the hidden progressive award. For example, if a hidden progressive award increments to a progressive award hit value of $100, the gaming system selects a stored game outcome from a pool of stored game outcomes which is associated with an average expected award value of $100 and then regenerates this selected game outcome. In these embodiments, the longer a progressive award goes unpaid (i.e., the longer a progressive award is not triggered), the greater the award values of the stored game outcomes.

In one embodiment, when the gaming system triggers a progressive award and regenerates a stored game outcome, the progressive award is reset such that the average award value of the stored game outcomes in the pool is equal (or is within a designated range of) the current value of the reset progressive. In another embodiment, when the gaming system triggers a progressive award and regenerates a stored game outcome, the progressive award is decremented to insure that the maximum award value of any of the stored game outcomes in the pool does not exceed the current value of the progressive award.

In another embodiment utilizing progressive awards, the gaming system maintains a set or pool of stored game outcomes for each progressive award. In this embodiment, each set or pool includes different ranges of awards values associated with the stored outcomes of that pool. In operation of this embodiment, when a progressive award triggering event occurs for one of the progressive awards, the gaming system randomly selects one of the stored game outcomes from the pool of stored game outcomes associated with that progressive award. The gaming system then modifies the stored game outcomes in the pool, such a removing all of the stored game outcomes or removing certain stored game outcomes and leaving other stored game outcomes (e.g., clearing the pool of all game outcomes except the stored game outcome associated with the lowest award value). It should be appreciated that over time, such an embodiment has the effect of the average award value of the pool of stored game outcomes increases.

In another embodiment utilizing progressive awards, the gaming system maintains a set or pool of stored game outcomes for each progressive award. In this embodiment, each set or pool includes different ranges of awards values associated with the stored outcomes of that pool, wherein as the value of the progressive award increases, the ranges of award values increase also (thereby increasing the average expected award value of the pool of stored game outcomes).

In another embodiment, one or more game outcome regeneration triggering events are each associated with a triggered play of a bonus game (which is associated with an average expected value). In this embodiment, when a game outcome regeneration triggering event occurs (i.e., when a play of a bonus game is triggered), the gaming system selects a stored game outcome based, at least in part, on the average expected value of the triggered play of the bonus game. Such an embodiment provides that a paytable (including an average expected value of a triggered bonus) funds the regeneration of one or more stored game outcomes.

In another embodiment, one or more game outcome regeneration triggering events are each associated with a designated symbol combination (which is associated with an award value). In this embodiment, when a game outcome regeneration triggering event occurs (i.e., when a designated symbol combination is generated), the gaming system selects a stored game outcome based, at least in part, on the award value of the generated symbol combination. In one such embodiment, the gaming system selects a stored game outcome having an award value equal to (or within a designated range of) the award value of the generated symbol combination. For example, if a symbol combination associated with an award value of one-thousand credits is generated, the gaming system selects a stored game outcome associated with an award value of one-thousand credits. In another such embodiment, the gaming system selects a stored game outcome from a pool of stored game outcomes having an average expected award value equal to (or within a designated range of) the award value of the generated symbol combination. For example, if a symbol combination associated with an award value of one-thousand credits is generated, the gaming system accesses a pool of stored game outcomes having an average expected award value of one-thousand credits and then selects a stored game outcome from this accessed pool. Such embodiments provide that a paytable funds the regeneration of one or more stored game outcomes.

In another embodiment wherein a paytable funds the regeneration of one or more outcomes, as the average award value associated with the stored game outcomes of a pool changes, the gaming system modifies the probability of a game outcome regeneration triggering event occurring. For example, as the average award value associated with the stored game outcomes of a pool increases, the gaming system decreases the probability of any of the stored game outcomes being regenerated. In another example, as the average award value associated with the stored game outcomes of a pool decreases, the gaming system increases the probability of any of the stored game outcomes being regenerated.

In another embodiment wherein a paytable funds the regeneration of one or more outcomes, as the average award value associated with the stored game outcomes of a pool changes, the gaming system does not modify the probability of a game outcome regeneration triggering event occurring. Such an embodiment provides players an increased average expected payout for playing more games over a designated period of time.

In another embodiment wherein a paytable funds the regeneration of one or more outcomes, the gaming systems maintains a larger pool of stored game outcomes and upon a game outcome regeneration triggering event occurring, the gaming system randomly selects from a subset of stored game outcomes having an average expected award value which matches the average expected award value of the paytable.

In another embodiment, a game outcome regeneration triggering event is associated with a bonus game triggering event. In this embodiment, upon the occurrence of a bonus game triggering event, the gaming system determines whether to provide the player the triggered bonus game or select a stored game outcome from a pool of stored game outcomes. In one such embodiment, if the gaming system determines to not trigger a bonus game (but rather to select and regenerate a stored game outcome), the gaming system selects a stored game outcome from a pool of stored game outcomes having an average award value equal to (or within a designated range of) the average expected award value of the triggered (but not provided) bonus game.

In one embodiment, the gaming system displays to the player one or more of the currently stored game outcomes in association with one or more display devices. In another embodiment, the gaming system periodically displays to the player one or more of the currently stored game outcomes in association with one or more display devices. In another embodiment, the gaming device does not display to the player the currently stored game outcomes.

In another embodiment, the gaming system regenerates one or more stored games utilizing an application running in one or more service windows, such as the service windows described in U.S. Published Patent Application No. 2007/0243934, U.S. Published Patent Application No. 2007/0243928, U.S. Published Patent Application No. 2008/0009344, U.S. Published Patent Application No. 2009/0104954, and/or U.S. Published Patent Application No. 2009/0233705.

In different embodiments, the play of the primary game which generates an outcome which may or may not be stored includes, but is not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game.

In different embodiments, the play of the bonus game which generates an outcome which may or may not be stored includes, but is not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game.

In one embodiment, in addition to removing one or more stored game outcomes from a pool of stored game outcomes based on such stored game outcome expiring or such stored game outcomes being replaced with more lucrative game outcomes, the gaming system determines whether to remove one or more stored game outcomes from a pool. In one such embodiment, upon a designated triggering event, such as a regeneration of a stored game outcome associated with a maximum award value or a player ceasing play of a game, the gaming system removes one, more or each of the stored game outcomes from a pool.

In another embodiment, when a stored game outcome expires and is removed from a pool of stored game outcomes, the gaming system determines to replace the expired game outcome with a previously removed, non-expired game outcome. For example, upon an expiration of a first game outcome from a pool of stored game outcomes, the gaming system accesses a second game outcome (which was replaced in the pool with a different game outcome having a more lucrative award value than the award value of the second game outcome) and replaces the first game outcome with the second game outcome.

In another embodiment, upon a stored game outcome being regenerated or replayed, the gaming system removes this game outcome from the set or pool of stored game outcomes. In another embodiments, upon a stored game outcome being regenerated or replayed, the gaming system retains this game outcome in the set or pool of stored game outcomes.

In another embodiment, the gaming system enables a player to determine which game outcomes are stored and/or which game outcomes are discarded from the pool. In one such embodiment wherein the stored game outcomes are different types of awards (i.e., quantities of free spins, modifiers), the decision of which game outcomes to store and which game outcomes to discard involve a certain degree of player strategy.

In another embodiment, the gaming system provides one or more additional award opportunities to the player based on the contents of a set or pool of stored game outcomes. In one such embodiment, the gaming system provides the player an additional award or an additional award opportunity based on the quantity of like-kind game outcomes stored in the set or pool of game outcomes. For example, the gaming system provides the player a 5× multiplier for one or more awards if the gaming system determines that a pool includes five game outcomes that are each associated with an award value of $10. In this example, if gaming system also enables a player to determine which game outcomes are stored and/or which game outcomes are discarded from the pool, an element of strategy is introduced for the player to potentially store a game outcome associated with a relatively low award value if the storage of that game outcomes causes the gaming system to provide the player an additional award or an additional award opportunity based on the stored quantity of this game outcome.

In another embodiment, the gaming system dynamically modifies the quantity of game outcomes stored in a set or pool based on one or more triggering events or conditions. That is, the gaming system reduces or shrinks the size of the pool (and thus increases the odds of a stored game outcome associated with a higher valued award being selected) or increases or expands the size of the pool (and thus decreases the odds of a stored game outcome associated with a higher valued award being selected) based on the satisfaction of one or more conditions. In different embodiments, the gaming system modifies the quantity of stored game outcomes in a set or pool based on the quantity of players playing at a bank of gaming devices, based on the rate which one or more players are playing one or more games and/or based on the amounts one or more players are wagering.

In another embodiment, upon a suitable triggering event occurring, the gaming system provides the player each of the stored game outcomes in association with a single play of a game. In another embodiment, upon a suitable triggering event occurring, the gaming system discards each of the stored game outcomes in a set or pool of stored game outcomes. In one example embodiment, upon a suitable event occurs, the gaming system provides a player (either at a stand-alone gaming device or at a gaming device of a bank of gaming devices) with a choice of replaying a single stored game outcome or participating in a play of a bonus game for a chance to win each of the stored game outcomes. In this embodiment, if the player is successful in the play of the bonus game, the gaming system provides the player each of the stored game outcomes. On the other hand, if the player is unsuccessful in the play of the bonus game, the gaming system discards each of the stored game outcomes in a set or pool of stored game outcomes.

In another embodiment, rather than providing the player a regenerated play of a game as a bonus game, the gaming system enables a player to accept a replayed game of similar value to the player's awarded bonus. For example, if a player is awarded a free spins bonus with an expected value of 1000 credits, the gaming system provides the player the choice to take a replay game instead. In one such example, the awarded free spins are still run in the background and stored off on the server for later replay.

It should be appreciated that in different embodiments, one or more of:

i. a determination of whether a game outcome storage triggering event occurs;

ii. a determination of whether a game outcome regeneration triggering event occurs;

iii. a quantity of game outcomes stored in a set or pool of stored game outcomes;

iv. a quantity of sets or pools of stored game outcomes and the quantity of game outcomes stored in each set or pool of stored game outcomes;

v. a determination of which stored game outcome to select from the set of stored game outcomes;

vi. a determination of which of a plurality of sets of stored game outcomes to select a stored game outcome from;

vii. a determination of if a progressive award triggering event occurs;

viii. a determination of whether to remove one or more stored game outcomes from a pool of stored game outcomes;

ix. a determination to modify the quantity of outcomes stored in a pool of stored game outcomes;

x. which pools of stored game outcomes are associated with which players;

xi. whether to enable a player to determine which game outcomes are stored in a pool of stored game outcomes;

xii. whether to enable a player to determine which game outcomes are to be discarded from a pool of stored game outcomes;

xiii. a determination of whether to provide a player each of the game outcomes of a pool of stored game outcomes in association with a single play of a game;

xiv. a determination of whether to discard each of the game outcomes of a pool of stored game outcomes; and xv. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) maintain a set of stored game outcomes, (b) for each of a plurality of plays of a game:

(i) randomly generate one of a plurality of game outcomes, (ii) display the randomly generated game outcome to a player, (iii) determine if said displayed game outcome is associated with one of a plurality of award values, (iv) provide any award value associated with the displayed game outcome, (v) determine whether to modify the maintained set of stored game outcomes, wherein said determination is based, at least in part, on the randomly generated game outcome, and (vi) if the determination is to modify the maintained set of stored game outcomes:

(A) select one of the stored game outcomes of the maintained set, (B) remove said selected stored game outcome from the maintained set, and (C) add the randomly generated game outcome to the maintained set, and (c) upon a random occurrence of a game outcome regeneration triggering event:

(i) select one of the stored game outcomes from the maintained set of stored game outcomes, (ii) redisplay the selected stored game outcome to the player, (iii) reprovide any award value associated with the selected stored game outcome, wherein the game outcome regeneration triggering event randomly occurs independent of any player input and independent of any displayed game outcomes in any of the plays of the game.

2. The gaming system of claim 1, wherein the determination of whether to modify the maintained set of stored game outcomes is based, at least in part, on a comparison of the randomly generated game outcome to at least one of the stored game outcomes.

3. The gaming system of claim 2, wherein when executed by the at least one processor, the plurality of instructions cause the at least one processor to:

determine if any of the stored game outcomes are associated with any award values less than the award value associated with the randomly determined game outcome, and if one of the stored game outcomes is associated with an award value less than the award value associated with the randomly determined game outcome, replace said stored game outcome with the randomly generated game outcome.

4. The gaming system of claim 1, wherein the determination of whether to modify the maintained set of stored game outcomes is based, at least in part, on a quantity of game outcomes stored in the set of stored game outcomes.

5. The gaming system of claim 4, wherein when executed by the at least one processor, the plurality of instructions cause the at least one processor to store the generated game outcome if the maintained set of stored game outcomes includes less than a designated quantity of stored game outcomes.

6. The gaming system of claim 1, wherein when executed by the at least one processor, the plurality of instructions cause the at least one processor to:

cause the game outcome regeneration triggering event to occur in association with a determination to provide a progressive award, and select one of the stored game outcomes based a value of the progressive award.

7. The gaming system of claim 1, wherein when executed by the at least one processor, the plurality of instructions cause the at least one processor to:

maintain a plurality of sets of stored game outcomes, and select one of the sets of stored game outcomes upon the occurrence of the game outcome regeneration triggering event.

8. The gaming system of claim 1, wherein when executed by the at least one processor, the plurality of instructions cause the at least one processor to, independent of any generation of any game outcome, remove at least one of the stored game outcomes from the set of stored game outcomes.

9. The gaming system of claim 8, wherein when executed by the at least one processor, the plurality of instructions cause the at least one processor to remove one of the stored game outcomes from the set of stored game outcomes when said stored game outcome expires.

10. The gaming system of claim 1, wherein each stored game outcome is associated with a replay of a bonus game.

11. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) at a first point in time:

(i) maintain a first set of a first plurality of previously generated and currently stored game outcomes, wherein each of the first plurality of stored game outcomes is associated with an award value and the first set is associated with a first average expected award value, and (ii) upon a first random occurrence of a game outcome regeneration triggering event, select one of the stored game outcomes of the first set to regenerate, wherein the occurrence of the game outcome regeneration triggering event at the first point in time is associated with the first average expected award value, and occurs independent of any player input and independent of any displayed game outcomes in any plays of any games, and (b) at a second, subsequent point in time:

(i) maintain a second set of a second, different plurality of previously generated and currently stored game outcomes, wherein each of the second plurality of stored game outcomes is associated with an award value and the second set is associated with a second average expected award value, and (ii) upon a second random occurrence of the game outcome regeneration triggering event, select one of the stored game outcomes of the second set to regenerate, wherein the occurrence of the game outcome regeneration triggering event at the second point in time is associated with the second average expected award value and occurs independent of any player input and independent of any displayed game outcomes in any plays of any games.

12. The gaming system of claim 11, wherein the second average expected award value is greater than the first average expected award value.

13. The gaming system of claim 11, wherein the first average expected award value is greater than the second average expected award value.

14. The gaming system of claim 11, wherein each stored game outcome is associated with a replay of a bonus game.

15. A method of operating a gaming system, said method comprising:

(a) causing at least one processor to execute a plurality of instructions to maintain a set of stored game outcomes, (b) for each of a plurality of plays of a game:

(i) causing the at least one processor to execute the plurality of instructions to randomly generate one of a plurality of game outcomes, (ii) causing at least one display device to display the randomly generated game outcome to a player, (iii) causing the at least one processor to execute the plurality of instructions to determine if said displayed game outcome is associated with one of a plurality of award values, (iv) providing any award value associated with the displayed game outcome, (v) causing the at least one processor to execute the plurality of instructions to determine whether to modify the maintained set of stored game outcomes, wherein said determination is based, at least in part, on the randomly generated game outcome, and (vi) if the determination is to modify the maintained set of stored game outcomes:

(A) causing the at least one processor to execute the plurality of instructions to select one of the stored game outcomes of the maintained set, (B) causing the at least one processor to execute the plurality of instructions to remove said selected stored game outcome from the maintained set, and (C) causing the at least one processor to execute the plurality of instructions to add the randomly generated game outcome to the maintained set, and (c) upon a random occurrence of a game outcome regeneration triggering event:

(i) causing the at least one processor to execute the plurality of instructions to select one of the stored game outcomes from the maintained set of stored game outcomes, (ii) causing the at least one display device to display the selected stored game outcome to the player, (iii) providing any award value associated with the selected stored game outcome, wherein the game outcome regeneration triggering event randomly occurs independent of any player input and independent of any displayed game outcomes in any of the plays of the game.

16. The method of claim 15, wherein the determination of whether to modify the maintained set of stored game outcomes is based, at least in part, on a comparison of the randomly generated game outcome to at least one of the stored game outcomes.

17. The method of claim 16, which includes:

causing the at least one processor to execute the plurality of instructions to determine if any of the stored game outcomes are associated with any award values less than the award value associated with the randomly determined game outcome, and if one of the stored game outcomes is associated with an award value less than the award value associated with the randomly determined game outcome, causing the at least one processor to execute the plurality of instructions to replace said stored game outcome with the randomly generated game outcome.

18. The method of claim 15, wherein the determination of whether to modify the maintained set of stored game outcomes is based, at least in part, on a quantity of game outcomes stored in the set of stored game outcomes.

19. The method of claim 18, which includes causing the at least one processor to execute the plurality of instructions to store the generated game outcome if the maintained set of stored game outcomes includes less than a designated quantity of stored game outcomes.

20. The method of claim 15, which includes causing the at least one processor to execute the plurality of instructions to:

cause the game outcome regeneration triggering event to occur in association with a determination to provide a progressive award, and select one of the stored game outcomes based a value of the progressive award.

21. The method of claim 15, which includes:

causing the at least one processor to execute the plurality of instructions to maintain a plurality of sets of stored game outcomes, and causing the at least one processor to execute the plurality of instructions to select one of the sets of stored game outcomes upon the occurrence of the game outcome regeneration triggering event.

22. The method of claim 15, which includes causing the at least one processor to execute the plurality of instructions to, independent of any generation of any game outcome, remove at least one of the stored game outcomes from the set of stored game outcomes.

23. The method of claim 22, which includes causing the at least one processor to execute the plurality of instructions to remove one of the stored game outcomes from the set of stored game outcomes when said stored game outcome expires.

24. The method of claim 15, wherein each stored game outcome is associated with a replay of a bonus game.

25. The method of claim 15, which is executed through a data network.

26. The method of claim 25, wherein the data network is an internet.

27. A method of operating a gaming system, said method comprising:

(a) at a first point in time:

(i) causing at least one processor to execute a plurality of instructions to maintain a first set of a first plurality of previously generated and currently stored game outcomes, wherein each of the first plurality of stored game outcomes is associated with an award value and the first set is associated with a first average expected award value, and (ii) upon a first random occurrence of a game outcome regeneration triggering event, causing the at least one processor to execute the plurality of instructions to select one of the stored game outcomes of the first set to regenerate, wherein the occurrence of the game outcome regeneration triggering event at the first point in time is associated with the first average expected award value and occurs independent of any player input and independent of any displayed game outcomes in any plays of any games, and (b) at a second, subsequent point in time:

(i) causing the at least one processor to execute the plurality of instructions to maintain a second set of a second, different plurality of previously generated and currently stored game outcomes, wherein each of the second plurality of stored game outcomes is associated with an award value and the second set is associated with a second average expected award value, and (ii) upon a second random occurrence of the game outcome regeneration triggering event, causing the at least one processor to execute the plurality of instructions to select one of the stored game outcomes of the second set to regenerate, wherein the occurrence of the game outcome regeneration triggering event at the second point in time is associated with the second average expected award value and occurs independent of any player input and independent of any displayed game outcomes in any plays of any games.

28. The method of claim 27, wherein the second average expected award value is greater than the first average expected award value.

29. The method of claim 27, wherein the first average expected award value is greater than the second average expected award value.

30. The method of claim 27, wherein each stored game outcome is associated with a replay of a bonus game.

31. The method of claim 27, which is executed through a data network.

32. The method of claim 31, wherein the data network is an internet.

* * * * *